United States Patent
Li (10) Patent No.: US 11,942,864 B2
(45) Date of Patent: Mar. 26, 2024

(54) VOLTAGE CONVERSION CIRCUIT AND DISPLAY DEVICE

(71) Applicant: TCL China Star Optoelectronics Technology Co., Ltd., Guangdong (CN)

(72) Inventor: Wenfang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 434 days.

(21) Appl. No.: 17/414,348

(22) PCT Filed: May 13, 2021

(86) PCT No.: PCT/CN2021/093590
§ 371 (c)(1),
(2) Date: Jun. 16, 2021

(87) PCT Pub. No.: WO2022/142066
PCT Pub. Date: Jul. 7, 2022

(65) Prior Publication Data
US 2023/0361675 A1 Nov. 9, 2023

(30) Foreign Application Priority Data

Dec. 31, 2020 (CN) .......................... 202011632851.X (51) Int. Cl.
*H02M 3/158* (2006.01)
*G09G 3/00* (2006.01)
(Continued)

(52) U.S. Cl.
CPC ............ *H02M 3/158* (2013.01); *G09G 3/006* (2013.01); *H02M 3/1584* (2013.01);
(Continued)

(58) Field of Classification Search
CPC ...... H02M 3/158; H02M 3/1584; H02M 3/00; H02M 3/1582; H02M 5/00; H02M 7/00;
(Continued)

(56) References Cited

U.S. PATENT DOCUMENTS 10,663,998 B1 * 5/2020 Salus ...................... G05F 1/613
2009/0174388 A1 * 7/2009 Kung ................... H03K 17/302
323/311

(Continued)

FOREIGN PATENT DOCUMENTS

CN  101089768  12/2007
CN  103633834  3/2014
(Continued)

*Primary Examiner* — Brent D Castiaux (57) ABSTRACT

A voltage conversion circuit and a display device are provided. The voltage conversion circuit includes a voltage conversion module, a comparison module, and a control module. The voltage conversion module includes at least two voltage conversion units, and the voltage conversion unit converts the input voltage into a target voltage. The comparison module compares each of testing voltages with a reference voltage to generate a feedback signal. The control module receives the feedback signal and controls the voltage conversion unit to convert the input voltage to the target voltage based on the feedback signal.

16 Claims, 5 Drawing Sheets

(51) Int. Cl.
 *H02M 3/00* (2006.01)
 *H02M 5/00* (2006.01)
 *H02M 7/00* (2006.01)

(52) U.S. Cl.
 CPC ........... *G09G 2330/12* (2013.01); *H02M 3/00* (2013.01); *H02M 3/1582* (2013.01); *H02M 5/00* (2013.01); *H02M 7/00* (2013.01)

(58) Field of Classification Search
 CPC ............ H02M 1/0009; H02M 1/0032; H02M 1/0054; G09G 3/006; G09G 2330/12; G09G 2330/021; G09G 2330/028; Y02B 70/10
 See application file for complete search history.

(56) References Cited

U.S. PATENT DOCUMENTS

| | | | |
|---|---|---|---|
| 2011/0221405 A1* | 9/2011 | Tang | G01R 35/005 323/234 |
| 2017/0214318 A1 | 7/2017 | Takenaka | |
| 2018/0091057 A1 | 3/2018 | Sonnaillon | |
| 2019/0168634 A1* | 6/2019 | Teng | B60L 58/20 |

FOREIGN PATENT DOCUMENTS

| | | |
|---|---|---|
| CN | 106992672 | 7/2017 |
| CN | 108923650 | 11/2018 |
| CN | 109120153 | 1/2019 |
| CN | 109742949 | 5/2019 |
| CN | 110048605 | 7/2019 |
| CN | 112671236 | 4/2021 |

\* cited by examiner

VOLTAGE CONVERSION CIRCUIT AND DISPLAY DEVICE

RELATED APPLICATIONS

This application is a National Phase of PCT Patent Application No. PCT/CN2021/093590 having International filing date of May 13, 2021, which claims the benefit of priority of Chinese Patent Application No. 202011632851.X filed on Dec. 31, 2020. The contents of the above applications are all incorporated by reference as if fully set forth herein in their entirety.

FIELD AND BACKGROUND OF THE INVENTION

This disclosure relates to a field of display technology, and more particularly, to a voltage conversion circuit and a display device.

A display device generally includes a display panel and an external driving system. The external driving system provides analog power supply voltage (VAA), digital power supply voltage (VDD), gate on voltage (VGH), gate off voltage (VGL) and other voltages to make the display panel display normally. Besides, VAA and VDD are relatively large. Therefore, the external driving system generally includes a voltage conversion circuit to convert an input voltage into VAA or VDD required for the normal operation of the display device.

However, as people have higher requirements for the quality of the display panel, the resolution of the display panel is also higher. With the improvement of the resolution of the display panel, the voltage/current of each circuit in the driving system also increases, and the temperature of the voltage conversion circuit becomes higher and higher correspondingly. In order to solve this problem, the voltage conversion circuit is usually designed as multiple branches to obtain VAA or VDD. However, this design may reduce the operation efficiency of the voltage conversion circuit under a light loading (that is, the loading for receiving VAA or VDD is small).

SUMMARY OF THE INVENTION

The disclosure provides a voltage conversion circuit and a display device to solve the technical problem that the voltage conversion circuit art has low working efficiency under a light loading in the conventional technology.

The disclosure provides a voltage conversion circuit. The voltage conversion circuit comprises:
 a voltage conversion module receiving an input voltage, wherein the voltage conversion module comprises at least two voltage conversion units, and the voltage conversion unit is configured to convert the input voltage into a target voltage;
 a comparison module electrically connected to the voltage conversion module, wherein the comparison module receives a reference voltage, and the comparison module acquires a testing voltage of each of the voltage conversion units, and compares each of the testing voltages with the reference voltage to generate a feedback signal; and
 a control module electrically connected to the voltage conversion module and the comparison module, wherein the control module receives the feedback signal and controls the voltage conversion unit to convert the input voltage to the target voltage based on the feedback signal.

In the voltage conversion circuit of the disclosure, the voltage conversion circuit comprises a first voltage conversion unit and a second voltage conversion unit. The comparison module acquires a first testing voltage of the first voltage conversion unit and a second testing voltage of the second voltage conversion unit, and compares the first testing voltage and the second testing voltage with the reference voltage respectively to generate the feedback signal. The control module receives the feedback signal, outputs a first control signal to the first voltage conversion unit and outputs a second control signal to the second voltage conversion unit based on the feedback signal for controlling the first voltage conversion unit and the second voltage conversion unit to convert the input voltage to the target voltage.

In the voltage conversion circuit of the disclosure, when the first testing voltage and the second testing voltage are both less than the reference voltage, the control module controls either the first voltage conversion unit or the second voltage conversion unit to operate for converting the input voltage to the target voltage.

In the voltage conversion circuit of the disclosure, when the first testing voltage and the second testing voltage are both greater than the reference voltage, the control module controls the first voltage conversion unit and the second voltage conversion unit to simultaneously operate for converting the input voltage to the target voltage.

In the voltage conversion circuit of the disclosure, the first testing voltage is same as the second testing voltage.

In the voltage conversion circuit of the disclosure, the first testing voltage is different from the second testing voltage.

In the voltage conversion circuit of the disclosure, the comparison module comprises a first comparator and a second comparator. A first input terminal of the first comparator receives the reference voltage, a second input terminal of the first comparator receives the first testing voltage, and the first comparator outputs a first level signal according to the reference voltage and the first testing voltage. A first input terminal of the second comparator receives the reference voltage, a second input terminal of the second comparator receives the second testing voltage, and the second comparator outputs a second level signal according to the reference voltage and the second testing voltage.

In the voltage conversion circuit of the disclosure, the feedback signal comprises the first level signal and the second level signal.

In the voltage conversion circuit of the disclosure, the comparison module further comprises an AND gate. The AND gate is electrically connected to the first comparator and the second comparator, a first input terminal of the AND gate receives the first level signal, a second input terminal of the AND gate receives the second level signal, and the AND gate outputs the feedback signal according to the first level signal and the second level signal.

In the voltage conversion circuit of the disclosure, the first voltage conversion unit comprises a first transistor, a first inductor, a first capacitor, a first diode and a first resistor, the second voltage conversion unit comprises a second transistor, a second inductor, a second capacitor, a second diode and a second resistor. A gate of the first transistor receives the first control signal, a source of the first transistor, a first end of the first inductor, and an anode of the first diode are electrically connected, a drain of the first transistor and a first end of the first resistor are electrically connected to a first testing voltage output terminal, the first testing voltage output terminal is configured for outputting the first testing voltage, a second end of the first inductor receives the input voltage, a second end of the first resistor and a first end of the first capacitor are connected to a grounding end, and a cathode of the first diode and a second end of the first capacitor are connected to a target voltage output terminal. A gate of the second transistor receives the second control signal, a source of the second transistor, a first end of the second inductor, and an anode of the second diode are electrically connected, a drain of the second transistor and a first end of the second resistor are electrically connected to a second testing voltage output terminal, the second testing voltage output terminal is configured for outputting the second testing voltage, a second end of the second inductor receives the input voltage, a second end of the second resistor and a first end of the second capacitor are connected to the grounding end, and a cathode of the second diode and a second end of the second capacitor are connected to the target voltage output terminal.

In the voltage conversion circuit of the disclosure, the voltage conversion circuit further comprises a boost chip, and the control module and the comparison module are integrated in the boost chip.

Accordingly, the disclosure further provides a display device. The display device comprises a voltage conversion circuit. The voltage conversion circuit comprises:

a voltage conversion module receiving an input voltage, wherein the voltage conversion module comprises at least two voltage conversion units, and the voltage conversion unit is configured to convert the input voltage into a target voltage;

a comparison module electrically connected to the voltage conversion module, wherein the comparison module receives a reference voltage, and the comparison module acquires a testing voltage of each of the voltage conversion units, and compares each of the testing voltages with the reference voltage to generate a feedback signal; and a control module electrically connected to the voltage conversion module and the comparison module, wherein the control module receives the feedback signal and controls the voltage conversion unit to convert the input voltage to the target voltage based on the feedback signal.

In the display device of the disclosure, the voltage conversion circuit comprises a first voltage conversion unit and a second voltage conversion unit. The comparison module acquires a first testing voltage of the first voltage conversion unit and a second testing voltage of the second voltage conversion unit, and compares the first testing voltage and the second testing voltage with the reference voltage respectively to generate the feedback signal. The control module receives the feedback signal, outputs a first control signal to the first voltage conversion unit and outputs a second control signal to the second voltage conversion unit based on the feedback signal for controlling the first voltage conversion unit and the second voltage conversion unit to convert the input voltage to the target voltage.

In the display device of the disclosure, when the first testing voltage and the second testing voltage are both less than the reference voltage, the control module controls either the first voltage conversion unit or the second voltage conversion unit to operate for converting the input voltage to the target voltage.

In the display device of the disclosure, when the first testing voltage and the second testing voltage are both greater than the reference voltage, the control module controls the first voltage conversion unit and the second voltage conversion unit to simultaneously operate for converting the input voltage to the target voltage.

In the display device of the disclosure, the comparison module comprises a first comparator and a second comparator. A first input terminal of the first comparator receives the reference voltage, a second input terminal of the first comparator receives the first testing voltage, and the first comparator outputs a first level signal according to the reference voltage and the first testing voltage. A first input terminal of the second comparator receives the reference voltage, a second input terminal of the second comparator receives the second testing voltage, and the second comparator outputs a second level signal according to the reference voltage and the second testing voltage.

In the display device of the disclosure, the feedback signal comprises the first level signal and the second level signal.

In the display device of the disclosure, the comparison module further comprises an AND gate. The AND gate is electrically connected to the first comparator and the second comparator, a first input terminal of the AND gate receives the first level signal, a second input terminal of the AND gate receives the second level signal, and the AND gate outputs the feedback signal according to the first level signal and the second level signal.

In the display device of the disclosure, the first voltage conversion unit comprises a first transistor, a first inductor, a first capacitor, a first diode and a first resistor, the second voltage conversion unit comprises a second transistor, a second inductor, a second capacitor, a second diode and a second resistor. A gate of the first transistor receives the first control signal, a source of the first transistor, a first end of the first inductor, and an anode of the first diode are electrically connected, a drain of the first transistor and a first end of the first resistor are electrically connected to a first testing voltage output terminal, the first testing voltage output terminal is configured for outputting the first testing voltage, a second end of the first inductor receives the input voltage, a second end of the first resistor and a first end of the first capacitor are connected to a grounding end, and a cathode of the first diode and a second end of the first capacitor are connected to a target voltage output terminal. A gate of the second transistor receives the second control signal, a source of the second transistor, a first end of the second inductor, and an anode of the second diode are electrically connected, a drain of the second transistor and a first end of the second resistor are electrically connected to a second testing voltage output terminal, the second testing voltage output terminal is configured for outputting the second testing voltage, a second end of the second inductor receives the input voltage, a second end of the second resistor and a first end of the second capacitor are connected to the grounding end, and a cathode of the second diode and a second end of the second capacitor are connected to the target voltage output terminal.

In the display device of the disclosure, the voltage conversion circuit further comprises a boost chip, and the control module and the comparison module are integrated in the boost chip.

The application provides a voltage conversion circuit and a display device. The voltage conversion circuit comprises a voltage conversion module, a comparison module, and a control module. The voltage conversion module comprises at least two voltage conversion units. The comparison module detects the testing voltage in the voltage conversion module and outputs a feedback signal. The control module determines whether the voltage conversion circuit is operating under a light loading according to the feedback signal, and then controls the operation of one or more voltage conversion units in the voltage conversion module to convert a input voltage to a target voltage, thereby improving the working efficiency of the voltage conversion circuit under the light loading.

BRIEF DESCRIPTION OF THE SEVERAL VIEWS OF THE DRAWINGS

In order to more clearly illustrate the embodiments of the disclosure or the technical solutions in the prior art, the following briefly introduces the accompanying drawings used in the embodiments. Obviously, the drawings in the following description merely show some of the embodiments of the disclosure. As regards one of ordinary skill in the art, other drawings can be obtained in accordance with these accompanying drawings without making creative efforts.

DESCRIPTION OF SPECIFIC EMBODIMENTS OF THE INVENTION

The technical solutions in the embodiments of the disclosure will be described clearly and completely below with reference to the drawings in the embodiments of the disclosure. Obviously, the described embodiments are only a part of the embodiments of the disclosure, but not all the embodiments. Based on the embodiments in the disclosure, all other embodiments obtained by those skilled in the art without creative efforts fall within the scope of the disclosure.

Figure 1:
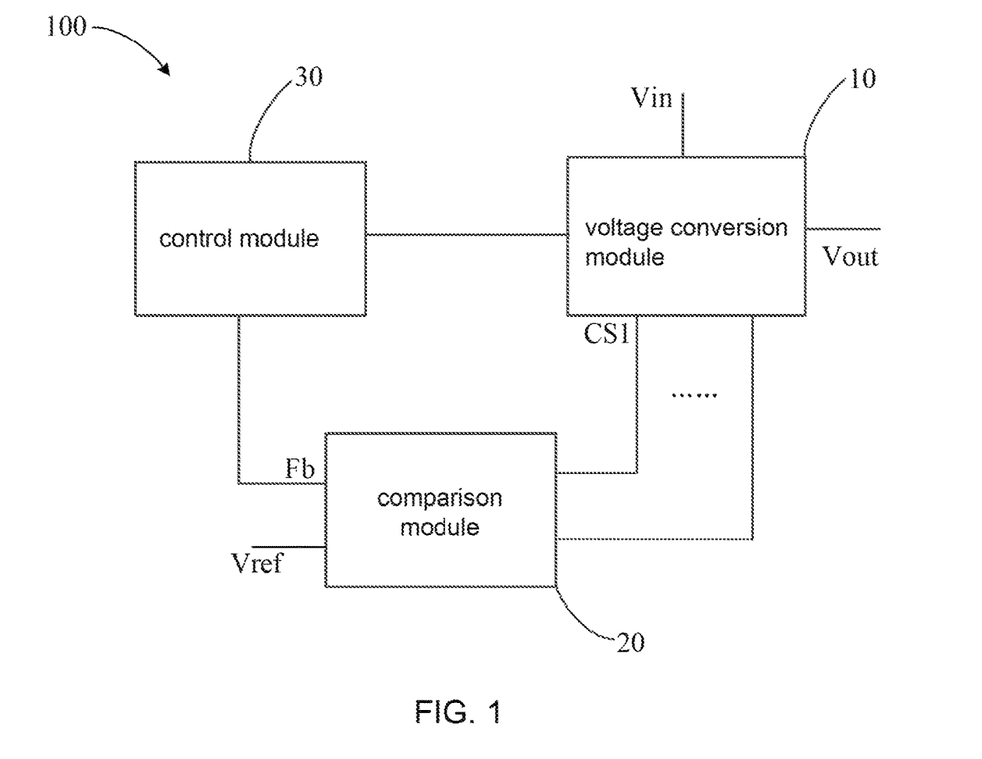
FIG. 1 is a schematic diagram of a first structure of a voltage conversion circuit according to the disclosure.
Figure 2:
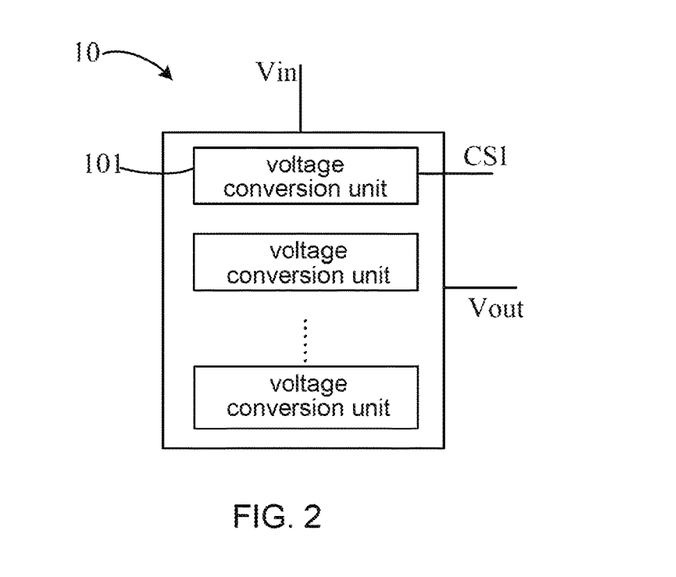
FIG. 2 is a schematic diagram of the first structure of the voltage conversion module according to FIG. 1.

Referring to FIG. 1 and FIG. 2, a schematic diagram of a first structure of a voltage conversion circuit according to the disclosure is shown in FIG. 1 and a schematic diagram of the first structure of the voltage conversion module according to FIG. 1 is shown in FIG. 2. In this embodiment of the disclosure, a voltage conversion circuit 100 includes a voltage conversion module 10, a comparison module 20 and a control module 30.

The voltage conversion module 10 receives an input voltage Vin. The voltage conversion module 10 includes at least two voltage conversion units 101. The voltage conversion unit 101 converts the input voltage Vin to a target voltage Vout. Specifically, a plurality of voltage conversion units 101 operate in parallel. Each of the voltage conversion units 101 receives an input voltage Vin. Theoretically, the input voltage Vin received by each of the voltage conversion units 101 is the same. Of course, in some embodiments, the input voltage Vin received by each of the voltage conversion units 101 may be different, which is not specifically defined in the disclosure.

The comparison module 20 is electrically connected to the voltage conversion module 10. The comparison module 20 receives a reference voltage Vref. The comparison module 20 obtains a testing voltage CS1 of each voltage conversion unit 101 and compares each testing voltage CS1 to the reference voltage Vref to generate a feedback signal Fb.

The control module 30 is electrically connected to the voltage conversion module 10 and the comparison module 20. The control module 30 receives the feedback signal Fb, and controls the voltage conversion unit 101 to convert the input voltage Vin to the target voltage Vout based on the feedback signal Fb.

Specifically, when each testing signal CS1 is greater than the reference voltage Vref, the control module 30 determines that the voltage conversion circuit 100 operates under a heavy loading (that is, the loading for receiving the target voltage Vout is larger) according to the feedback signal Fb, and then controls each voltage conversion unit 101 to simultaneously operate for converting the input voltage Vin to the target voltage Vout. Thus, the driving capability of the voltage conversion circuit 100 is improved. When each testing signal CS1 is less than the reference voltage Vref, the control module 30 determines that the voltage conversion circuit 100 operates under a light loading according to the feedback signal Fb, and then controls one or more voltage conversion units 101 to operates for converting the input voltage Vin to the target voltage Vout, thereby reducing circuit loss and improving the working efficiency of the voltage conversion circuit 100 under the light loading.

It can be understood that, theoretically, the testing voltage CS1 of each voltage conversion unit 101 is the same. However, due to different circuit loss or differences in the specifications of components in each voltage conversion unit 101, the testing voltage CS1 of each voltage conversion unit 101 is different. Therefore, in practical application, the testing voltage CS1 of one of the voltage conversion units 101 is greater than the reference voltage Vref, and the testing voltage CS1 of the other voltage conversion unit 101 is less than the reference voltage Vref. At this time, the control module 30 still determines that the voltage conversion circuit 100 is operating under the heavy loading according to the feedback signal Fb, and then controls each of the voltage conversion units 101 to operate, so as to convert the input voltage Vin to the target voltage Vout, thereby prevent insufficient driving capability of the voltage conversion circuit 100 when operating under the heavy loading.

In this embodiment, it can be seen that the comparison module 20 is provided in the voltage conversion circuit 100. When the voltage conversion circuit 100 is operating, the comparison module 20 is configured to detect the testing voltage CS1 of each voltage conversion unit 101 and output the feedback signal Fb to the control module 30. The control module 30 determines an operation mode of the voltage conversion circuit 100 according to the feedback signal Fb, and then controls the voltage conversion unit 101 to operate for converting the input voltage Vin to the target voltage Vout, thereby improving the working efficiency of the voltage conversion circuit 100 under the light loading.

It should be noted that, in the embodiment of the disclosure, the input voltage Vin and the target voltage Vout can be set according to voltage values required for the normal operation of various components of a display device in the actual application, which is not limited in the disclosure. In addition, the number of voltage conversion units 101 can be set according to the loading of the voltage conversion circuit 100, and a circuit structure of each voltage conversion unit 101 is the same. Specifically, the number of voltage conversion units 101 can be two, three or more.

Figure 3:
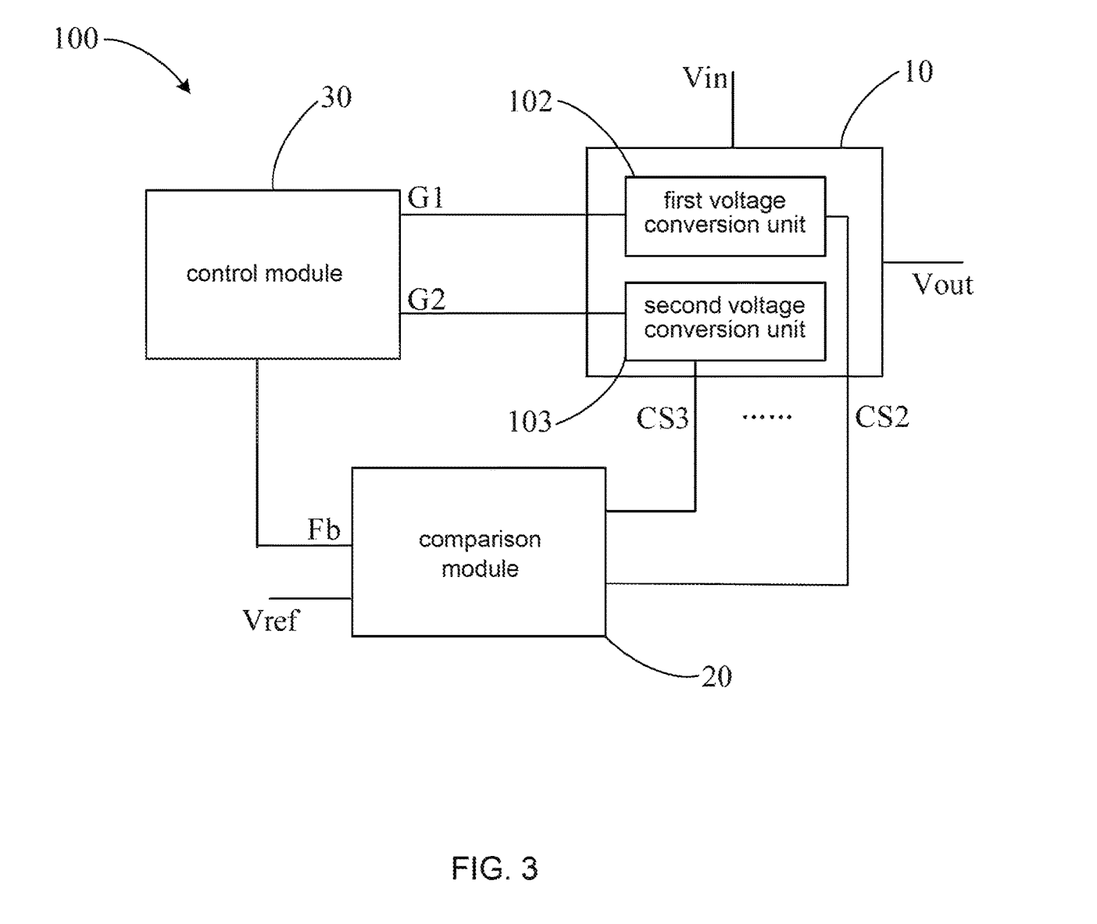
FIG. 3 is a schematic diagram of a second structure of the voltage conversion circuit according to the disclosure.

Referring to FIG. 3, a schematic diagram of a second structure of the voltage conversion circuit according to the disclosure is shown. In the voltage conversion circuit 100 provided by the embodiment of the disclosure, the voltage conversion module 10 includes a first voltage conversion unit 102 and a second voltage conversion unit 103.

In this embodiment, the comparison module 20 obtains a first testing voltage CS2 of the first voltage conversion unit 102 and a second testing voltage CS3 of the second voltage conversion unit 103, and compares the first testing voltage CS2 and the second testing voltage CS3 with a reference voltage Vref respectively to generate a feedback signal Fb.

The control module 30 receives the feedback signal Fb and outputs a first control signal G1 to the first voltage conversion unit 102 and a second control signal G2 to the second voltage conversion unit 103 based on the feedback signal Fb to control the first voltage conversion unit 102 and the second voltage conversion unit 103 to convert the input voltage Vin into the target voltage Vout.

Specifically, when both of the first testing voltage CS2 and the second testing voltage CS3 are less than the reference voltage Vref, the control module 30 determines that the voltage conversion circuit 100 operates under a light loading according to the feedback signal Fb. At this time, the control module 30 can control the first voltage conversion unit 102 to operate and control the second voltage conversion unit 103 to turn off, and can also control the first voltage conversion unit 102 to turn off and control the second voltage conversion unit 103 to operate, so as to improve the working efficiency of the voltage conversion circuit 100 under the light loading.

When both of the first testing voltage CS2 and the second testing voltage CS3 are greater than the reference voltage Vref, the control module 30 determines that the voltage conversion circuit 100 operates under a heavy loading according to the feedback signal Fb. At this time, the control module 30 controls the first voltage conversion unit 102 and the second voltage conversion unit 103 to operate simultaneously, thereby improving the driving capability of the voltage conversion circuit 100.

As described above, in some embodiments, the first testing voltage CS2 and the second testing voltage CS3 are the same. In other embodiments, since the circuit loss is different or the specifications of components are different in the first voltage conversion unit 102 and the second voltage conversion unit 103, and the first testing voltage CS2 and the second testing voltage CS3 are different. Therefore, in practical application, if the first testing voltage CS2 is greater than the reference voltage Vref, and the second testing voltage CS3 is less than the reference voltage Vref, or the first testing voltage CS2 is less than the reference voltage Vref, and the second testing voltage CS3 is greater than the reference voltage Vref, the control module 30 still determines that the voltage conversion circuit 100 operates under the heavy loading according to the feedback signal Fb for controlling the first voltage conversion unit 102 and the second voltage conversion unit 103 to operate simultaneously for converting the input voltage Vin to the target voltage Vout, thereby preventing insufficient driving capability of the voltage conversion circuit 100 when operating under the heavy loading.

Figure 4:
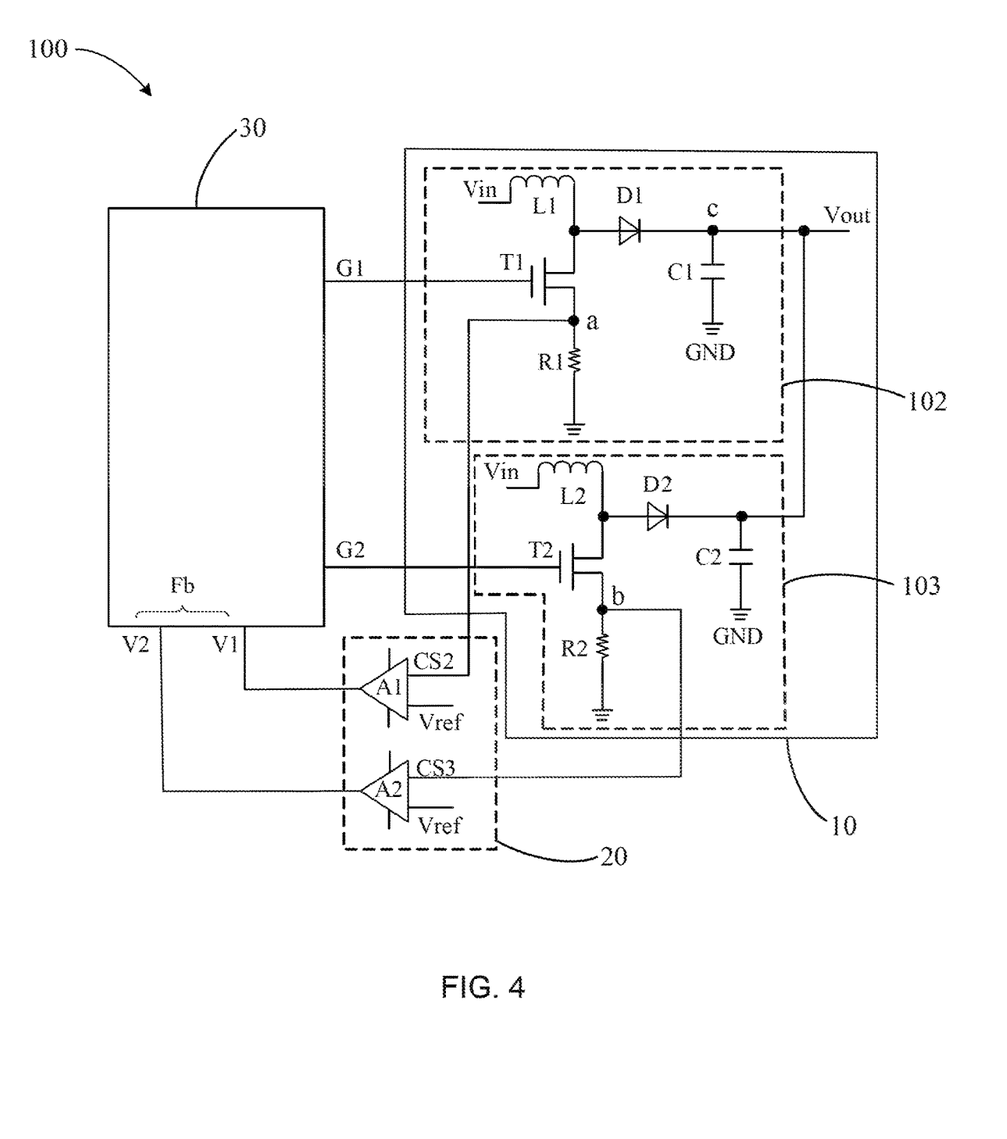
FIG. 4 is a circuit schematic diagram of a first circuit structure of the voltage conversion circuit according to the disclosure.

Referring to FIG. 4, a circuit schematic diagram of a first circuit structure of the voltage conversion circuit according to the disclosure is shown. In the voltage conversion circuit 100 provided by the embodiment of the disclosure, the comparison module 20 includes a first comparator A1 and a second comparator A2.

In this embodiment, a first input terminal of the first comparator A1 is connected to receive a reference voltage Vref. A second input terminal of the first comparator A1 is connected to receive a first testing voltage CS2. The first comparator A1 outputs a first level signal V1 according to the reference voltage Vref and the first testing voltage CS2.

A first input terminal of the second comparator A2 is connected to receive the reference voltage Vref. A second input terminal of the second comparator A2 is connected to receive a second testing voltage CS3. The second comparator A2 outputs a second level signal V2 according to the reference voltage Vref and the second testing voltage CS3.

It should be noted that the following embodiments of the disclosure are described by taking the second input terminal of the first comparator A1 and the second input terminal of the second comparator A2 used as the positive input terminal as an example, but it cannot be construed as a limitation of this disclosure.

Specifically, when the first testing voltage CS2 is greater than the reference voltage Vref, the first level signal V1 is a low level signal. When the first testing voltage CS2 is less than the reference voltage Vref, the first level signal V1 is a high level signal. When the second testing voltage CS3 is greater than the reference voltage Vref, the second level signal V2 is a low level signal. When the second testing voltage CS3 is less than the reference voltage Vref, the second level signal V2 is a high level signal.

Furthermore, in the embodiment of the disclosure, the first voltage conversion unit 102 includes a first transistor T1, a first inductor L1, a first capacitor C1, a first diode D1, and a first resistor R1. The second voltage conversion unit 103 includes a second transistor T2, a second inductor L2, a second capacitor C2, a second diode D2, and a second resistor R2.

Specifically, a gate of the first transistor T1 is connected to receive a first control signal G1. A source of the first transistor T1, a first end of the first inductor L1 and an anode of the first diode D1 are electrically connected. A drain of the first transistor T1 and a first end of the first resistor R1 are both electrically connected to a first testing voltage output terminal a. The first testing voltage output terminal a is configured for outputting the first testing voltage CS2. A second end of the first inductor L1 is connected to receive the input voltage Vin. The second end of the first resistor R1 and a first end of the first capacitor C1 are both connected to the ground end GND. A cathode of the first diode D1 and a second end of the first capacitor C1 are both connected to the target voltage output terminal c.

A gate of the second transistor T2 is connected to receive the second control signal G2. A source of the second transistor T2, a first end of the second inductor L2 and an anode of the second diode D2 are electrically connected, A drain of the second transistor T2 and a first end of the second resistor R2 are electrically connected to a second testing voltage output terminal b. The second testing voltage output terminal b is configured for outputting the second testing voltage CS2. A second end of the second inductor L2 is connected to receive the input voltage Vin. A second end of the second resistor R2 and a first end of the second capacitor C2 are connected to the grounding end, and a cathode of the second diode D2 and a second end of the second capacitor C2 are both connected to the target voltage output terminal c.

In the embodiment of the disclosure, the working principles of the first voltage conversion unit 102 and the second voltage conversion unit 103 are well known to those skilled in the art, and will not be repeated herein. The specifications of the first inductor L1, the second inductor L2, the first capacitor C1, the second capacitor C2, the first diode D1, the second diode D2, the first resistor R1, and the second resistor R2 can be adjusted according to actual requirements In the embodiment of the disclosure, the first transistor T1 and the second transistor T2 can be thin film transistors, field effect transistors or other devices with same characteristics. In addition, the transistors used in the embodiments of the disclosure include P-type transistors and/or N-type transistors. Besides, the P-type transistor is turned on when the gate is at a low level and is turned off when the gate is at a high level. The N-type transistor is turned on when the gate is at a high level and is turned off when the gate is at a low level. Therefore, the first control signal G1 and the second control signal G2 can be set according to the types of the first transistor T1 and the second transistor T2.

It should be noted that the following embodiments of the disclosure are described by taking the first transistor T1 and the second transistor T2 used as N-type transistors as examples, but it cannot be construed as the limitation of the application.

In the embodiment of the present application, the feedback signal Fb includes a first level signal V1 and a second level signal V2. That is, the control module 30 determines an operation mode of the voltage conversion circuit 100 according to the first level signal V1 and the second level signal V2, and then controls the operation states of the first voltage conversion unit 102 and the second voltage conversion unit 103.

Specifically, when the first testing voltage CS2 and the second testing voltage CS3 are both greater than the reference voltage Vref, the first level signal V1 and the second level signal V2 are both low level signals. At this time, the control module 30 determines that the voltage conversion circuit 100 operates under a heavy loading according to the first level signal V1 and the second level signal V2, and then outputs the first control signal G1 and the second control signal G2 to control the first voltage conversion unit 102 and the second voltage conversion unit 103 to operate simultaneously.

When the first testing voltage CS2 and the second testing voltage CS3 are both less than the reference voltage Vref, the first level signal V1 and the second level signal V2 are both high level signals. At this time, the control module 30 determines that the voltage conversion circuit 100 operates under a light loading according to the first level signal V1 and the second level signal V2, and then outputs the first control signal G1 and the second control signal G2 to control either the first voltage conversion unit 102 or the second voltage conversion unit 103 to operate.

Figure 5:
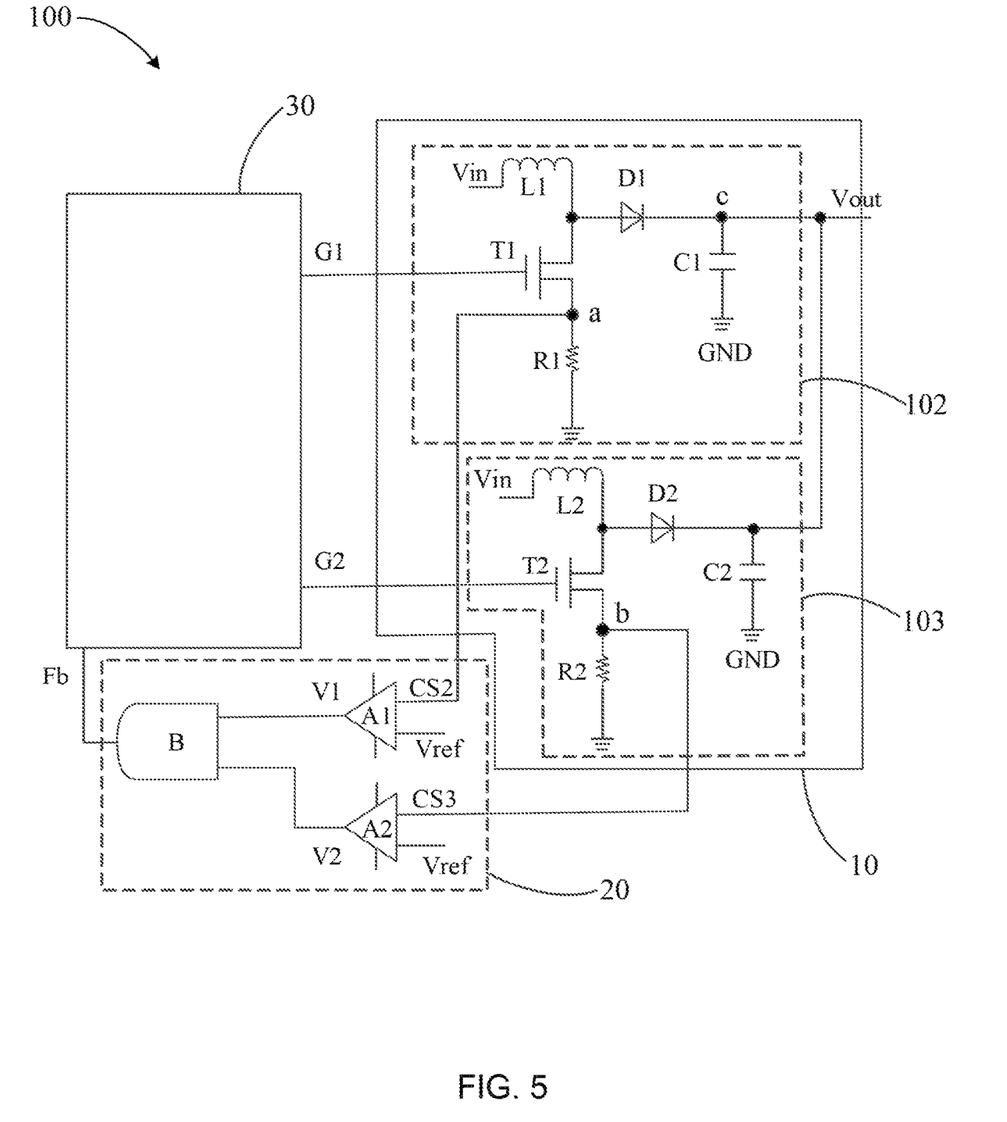
FIG. 5 is a circuit schematic diagram of a second circuit structure of the voltage conversion circuit according to the disclosure.

In another embodiment of the disclosure, referring to FIG. 5, a circuit schematic diagram of a second circuit structure of the voltage conversion circuit according to the disclosure is shown. The difference from the voltage conversion circuit 100 shown in FIG. 4 is that in the voltage conversion circuit 100 provided by this embodiment of the disclosure, the comparison module 20 further includes an AND gate B.

In this embodiment, the AND gate B is electrically connected to the first comparator A1 and the second comparator A2. A first input terminal of the AND gate B is connected to the first level signal V1. A second input terminal of the AND gate B is connected to the second level signal V2. The AND gate B outputs the feedback signal Fb according to the first level signal V1 and the second level signal V2.

Specifically, when the first level signal V1 and/or the second level signal V2 are low level signals, the feedback signal Fb output by the AND gate B is a low level signal. At this time, the control module 30 determines that the voltage conversion circuit 100 is operating under a heavy loading, and then outputs the first control signal G1 and the second control signal G2 to control the first voltage conversion unit 102 and the second voltage conversion unit 103 to operate simultaneously.

When the first level signal V1 and the second level signal V2 are both high level signals, the feedback signal Fb output by the AND gate B is a high level signal. At this time, the control module 30 determines that the voltage conversion circuit 100 is operating under light load, and then outputs the first control signal G1 and the second control signal G2 to control either the first voltage conversion unit 102 or the second voltage conversion unit 103 to operate.

In this embodiment, the AND gate B is provided in the comparison module 20. The first level signal V1 and the second level signal V2 are processed by the AND gate B, and the feedback signal Fb is directly generated. Furthermore, the feedback signal Fb is outputted to the control module 30, the response time of the control module 30 can be reduced, and the working efficiency of the voltage conversion circuit 100 can be further improved.

Figure 6:
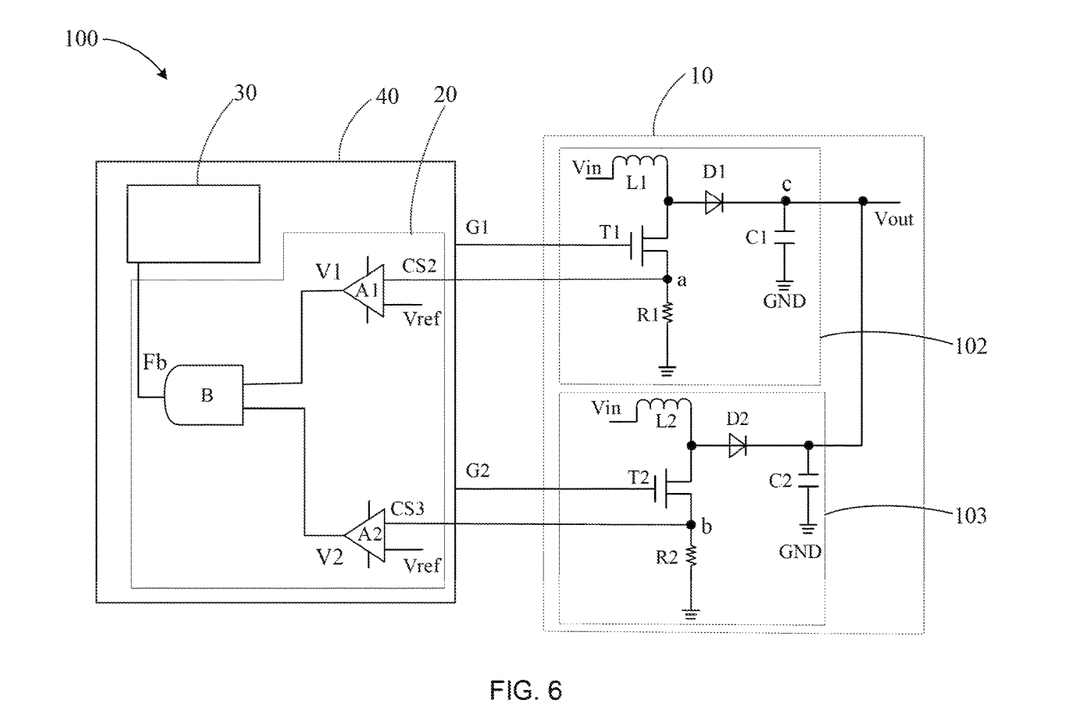
FIG. 6 is a circuit schematic diagram of a third circuit structure of the voltage conversion circuit according to the disclosure.

Referring to FIG. 6, a circuit schematic diagram of a third circuit structure of the voltage conversion circuit according to the disclosure is shown. As shown in FIG. 6, the difference between the voltage conversion circuit 100 shown in FIG. 5 and FIG. 6 is that in this embodiment of the disclosure, the voltage conversion circuit 100 further includes a boost chip 40 (BOOST IC). The control module 30 and the comparison module 20 are integrated in the boost chip 40.

In some embodiments, the control module 30 outputs the first control signal G1 and the second control signal G2 to the voltage conversion module 10 according to the feedback signal Fb. In other embodiments, after the control module 30 determines the operating state of the voltage conversion circuit 100 according to the feedback signal Fb, the boost chip 40 outputs the first control signal G1 and the second control signal G2 to the voltage conversion module 10.

In the embodiments of the disclosure, the control module 30 and the comparison module 20 are integrated in the boost chip 40 to improve the integration degree of the boost chip 40.

Accordingly, the disclosure further provides a display device driving system. The display device driving system includes the voltage conversion circuit described in any of the above embodiments. For details, please refer to the above description, which will not be repeated herein.

Figure 7:
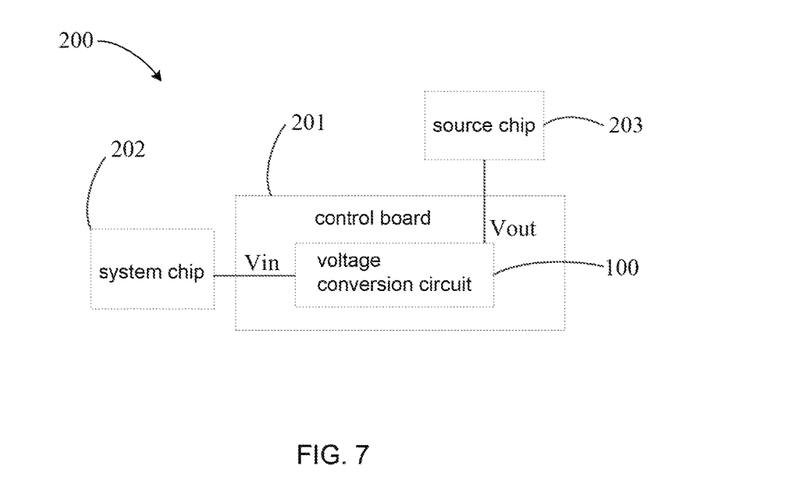
FIG. 7 is a structural schematic diagram of a display device driving system according to the disclosure.

In an embodiment of the disclosure, referring to FIG. 7, a structural schematic diagram of a display device driving system according to the disclosure is shown. The display device driving system 200 includes a control board 201, a system chip 202 and a source chip 203. The voltage conversion circuit 100 is arranged on the control board 201. The input voltage Vin is provided by the system chip 202 to the voltage conversion circuit 100. The voltage conversion circuit 100 outputs the target Vout to the source chip 203.

In another embodiment of the disclosure, a voltage management integrated chip is further disposed on the control board 201. The boost chip 40 is integrated in the voltage management integrated chip. The control module 30 and the comparison module 20 are integrated and arranged in the boost chip 40, and the voltage conversion module 10 is arranged on the control board 201, thereby simplifying the wiring on the control board 201 and preventing signal interference on the control board 201.

Accordingly, the disclosure further provides a display device, which includes the voltage conversion circuit described in any of the above embodiments or the display device driving system described in any of the above embodiments. For details, please refer to the above description, which will not be repeated herein. In addition, the display device is a smart phone, a tablet computer, an e-book reader, a smart watch, a video camera, a game console, etc., which is not limited in this disclosure.

The disclosure provides a display device. The display device includes a voltage conversion circuit, and the voltage conversion circuit includes a voltage conversion module, a comparison module, and a control module. Furthermore, the voltage conversion module includes at least two voltage conversion units. The comparison module detects a testing voltage in the voltage conversion module and outputs a feedback signal. The control module determines whether the voltage conversion circuit operates under a light loading according to the feedback signal, and controls one or more voltage conversion units in the voltage conversion module to operate, so as to convert the input voltage to the target voltage. That improves the working efficiency of the voltage conversion circuit under the light loading and ensures the quality of the display device.

The voltage conversion circuit and the display device provided by this disclosure are described in detail as abovementioned. In this disclosure, specific embodiments are used to illustrate the principles and implementation of the application. The description of the above embodiments is only used to understand the method and features of this disclosure. Simultaneously, for those of ordinary skill in the art, according to the features of the disclosure, there will be modifications in the specific embodiments and the scope of disclosure. In summary, the description of the specification should not be interpreted as a limitation to this disclosure.

What is claimed is:

1. A voltage conversion circuit, comprising:
    a voltage conversion module receiving an input voltage, wherein the voltage conversion module comprises at least two voltage conversion units, and the voltage conversion module is configured to convert the input voltage into a target voltage;
    a comparison module electrically connected to the voltage conversion module, wherein the comparison module receives a reference voltage, and the comparison module acquires a testing voltage of each of the voltage conversion units, and compares each of the testing voltages with the reference voltage to generate a feedback signal; and
    a control module electrically connected to the voltage conversion module and the comparison module, wherein the control module receives the feedback signal and controls the voltage conversion module to convert the input voltage to the target voltage based on the feedback signal;
    wherein the voltage conversion circuit comprises a first voltage conversion unit and a second voltage conversion unit;
    wherein the comparison module acquires a first testing voltage of the first voltage conversion unit and a second testing voltage of the second voltage conversion unit, and compares the first testing voltage and the second testing voltage with the reference voltage respectively to generate the feedback signal;
    wherein the control module receives the feedback signal, outputs a first control signal to the first voltage conversion unit and outputs a second control signal to the second voltage conversion unit based on the feedback signal for controlling the first voltage conversion unit and the second voltage conversion unit to convert the input voltage to the target voltage;
    wherein the first voltage conversion unit comprises a first transistor, a first inductor, a first capacitor, a first diode and a first resistor, the second voltage conversion unit comprises a second transistor, a second inductor, a second capacitor, a second diode and a second resistor;
    wherein a gate of the first transistor receives the first control signal, a source of the first transistor, a first end of the first inductor, and an anode of the first diode are electrically connected, a drain of the first transistor and a first end of the first resistor are electrically connected to a first testing voltage output terminal, the first testing voltage output terminal is configured for outputting the first testing voltage, a second end of the first inductor receives the input voltage, a second end of the first resistor and a first end of the first capacitor are connected to a grounding end, and a cathode of the first diode and a second end of the first capacitor are connected to a target voltage output terminal;
    wherein a gate of the second transistor receives the second control signal, a source of the second transistor, a first end of the second inductor, and an anode of the second diode are electrically connected, a drain of the second transistor and a first end of the second resistor are electrically connected to a second testing voltage output terminal, the second testing voltage output terminal is configured for outputting the second testing voltage, a second end of the second inductor receives the input voltage, a second end of the second resistor and a first end of the second capacitor are connected to the grounding end, and a cathode of the second diode and a second end of the second capacitor are connected to the target voltage output terminal.

2. The voltage conversion circuit according to claim 1, wherein when the first testing voltage and the second testing voltage are both less than the reference voltage, the control module controls either the first voltage conversion unit or the second voltage conversion unit to operate for converting the input voltage to the target voltage.

3. The voltage conversion circuit according to claim 1, wherein when the first testing voltage and the second testing voltage are both greater than the reference voltage, the control module controls the first voltage conversion unit and the second voltage conversion unit to simultaneously operate for converting the input voltage to the target voltage.

4. The voltage conversion circuit according to claim 1, wherein the first testing voltage is same as the second testing voltage.

5. The voltage conversion circuit according to claim 1, wherein the first testing voltage is different from the second testing voltage.

6. The voltage conversion circuit according to claim 1, wherein the comparison module comprises a first comparator and a second comparator;
    wherein a first input terminal of the first comparator receives the reference voltage, a second input terminal of the first comparator receives the first testing voltage, and the first comparator outputs a first level signal according to the reference voltage and the first testing voltage;

wherein a first input terminal of the second comparator receives the reference voltage, a second input terminal of the second comparator receives the second testing voltage, and the second comparator outputs a second level signal according to the reference voltage and the second testing voltage.

7. The voltage conversion circuit according to claim 6, wherein the feedback signal comprises the first level signal and the second level signal.

8. The voltage conversion circuit according to claim 6, wherein the comparison module further comprises an AND gate;

wherein the AND gate is electrically connected to the first comparator and the second comparator, a first input terminal of the AND gate receives the first level signal, a second input terminal of the AND gate receives the second level signal, and the AND gate outputs the feedback signal according to the first level signal and the second level signal.

9. The voltage conversion circuit according to claim 1, wherein the voltage conversion circuit further comprises a boost chip, and the control module and the comparison module are integrated in the boost chip.

10. A display device, comprising a voltage conversion circuit, wherein the voltage conversion circuit comprises:
a voltage conversion module receiving an input voltage, wherein the voltage conversion module comprises at least two voltage conversion units, and the voltage conversion module is configured to convert the input voltage into a target voltage;
a comparison module electrically connected to the voltage conversion module, wherein the comparison module receives a reference voltage, and the comparison module acquires a testing voltage of each of the voltage conversion units, and compares each of the testing voltages with the reference voltage to generate a feedback signal; and
a control module electrically connected to the voltage conversion module and the comparison module, wherein the control module receives the feedback signal and controls the voltage conversion module to convert the input voltage to the target voltage based on the feedback signal;
wherein the voltage conversion circuit comprises a first voltage conversion unit and a second voltage conversion unit;
wherein the comparison module acquires a first testing voltage of the first voltage conversion unit and a second testing voltage of the second voltage conversion unit, and compares the first testing voltage and the second testing voltage with the reference voltage respectively to generate the feedback signal;
wherein the control module receives the feedback signal, outputs a first control signal to the first voltage conversion unit and outputs a second control signal to the second voltage conversion unit based on the feedback signal for controlling the first voltage conversion unit and the second voltage conversion unit to convert the input voltage to the target voltage;
wherein the first voltage conversion unit comprises a first transistor, a first inductor, a first capacitor, a first diode and a first resistor, the second voltage conversion unit comprises a second transistor, a second inductor, a second capacitor, a second diode and a second resistor;

wherein a gate of the first transistor receives the first control signal, a source of the first transistor, a first end of the first inductor, and an anode of the first diode are electrically connected, a drain of the first transistor and a first end of the first resistor are electrically connected to a first testing voltage output terminal, the first testing voltage output terminal is configured for outputting the first testing voltage, a second end of the first inductor receives the input voltage, a second end of the first resistor and a first end of the first capacitor are connected to a grounding end, and a cathode of the first diode and a second end of the first capacitor are connected to a target voltage output terminal;

wherein a gate of the second transistor receives the second control signal, a source of the second transistor, a first end of the second inductor, and an anode of the second diode are electrically connected, a drain of the second transistor and a first end of the second resistor are electrically connected to a second testing voltage output terminal, the second testing voltage output terminal is configured for outputting the second testing voltage, a second end of the second inductor receives the input voltage, a second end of the second resistor and a first end of the second capacitor are connected to the grounding end, and a cathode of the second diode and a second end of the second capacitor are connected to the target voltage output terminal.

11. The display device according to claim 10, wherein when the first testing voltage and the second testing voltage are both less than the reference voltage, the control module controls either the first voltage conversion unit or the second voltage conversion unit to operate for converting the input voltage to the target voltage.

12. The display device according to claim 10, wherein when the first testing voltage and the second testing voltage are both greater than the reference voltage, the control module controls the first voltage conversion unit and the second voltage conversion unit to simultaneously operate for converting the input voltage to the target voltage.

13. The display device according to claim 10, wherein the comparison module comprises a first comparator and a second comparator;
wherein a first input terminal of the first comparator receives the reference voltage, a second input terminal of the first comparator receives the first testing voltage, and the first comparator outputs a first level signal according to the reference voltage and the first testing voltage;
wherein a first input terminal of the second comparator receives the reference voltage, a second input terminal of the second comparator receives the second testing voltage, and the second comparator outputs a second level signal according to the reference voltage and the second testing voltage.

14. The display device according to claim 13, wherein the feedback signal comprises the first level signal and the second level signal.

15. The display device according to claim 13, wherein the comparison module further comprises an AND gate;
wherein the AND gate is electrically connected to the first comparator and the second comparator, a first input terminal of the AND gate receives the first level signal, a second input terminal of the AND gate receives the second level signal, and the AND gate outputs the feedback signal according to the first level signal and the second level signal.

16. The display device according to claim 10, wherein the voltage conversion circuit further comprises a boost chip, and the control module and the comparison module are integrated in the boost chip.

* * * * *